(12) United States Patent
Campbell

(10) Patent No.: US 8,705,739 B2
(45) Date of Patent: Apr. 22, 2014

(54) ON-THE-FLY ENCRYPTION ON A GAMING MACHINE

(75) Inventor: Steven M. Campbell, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 637 days.

(21) Appl. No.: 12/065,297

(22) PCT Filed: Aug. 15, 2006

(86) PCT No.: PCT/US2006/031756
§ 371 (c)(1),
(2), (4) Date: Aug. 26, 2008

(87) PCT Pub. No.: WO2007/027427
PCT Pub. Date: Mar. 8, 2007

(65) Prior Publication Data
US 2009/0220078 A1 Sep. 3, 2009

Related U.S. Application Data

(60) Provisional application No. 60/712,321, filed on Aug. 29, 2005.

(51) Int. Cl.
H04K 1/00 (2006.01)
G06F 21/12 (2013.01)
G06F 21/44 (2013.01)
(52) U.S. Cl.
CPC .............. *G06F 21/121* (2013.01); *G06F 21/12* (2013.01); *G06F 21/44* (2013.01)
USPC ........... 380/251; 713/193; 713/180; 713/181; 463/29; 463/42; 705/57; 705/58; 705/59

(58) Field of Classification Search
CPC ....... G06F 21/51; G06F 21/64; G06F 21/123; G06F 21/30; G06F 21/44; G06F 21/12; G06F 21/21; G06F 21/121
USPC .......... 380/251, 259, 200–202; 713/193, 179, 713/180, 181, 165, 167, 176; 463/29, 463/40–42, 25; 726/26–30
See application file for complete search history.

(56) References Cited

U.S. PATENT DOCUMENTS 4,072,930 A 2/1978 Lucero
4,405,829 A 9/1983 Rivest et al.
(Continued)

FOREIGN PATENT DOCUMENTS

EP 1427494 A1 6/2004
EP 1703478 A2 9/2006
(Continued)

OTHER PUBLICATIONS

"International Search Report for Application No. PCT/US2006/31756, date mailed May 10, 2007", 4 pgs.
(Continued)

*Primary Examiner* — Nirav B Patel
(74) *Attorney, Agent, or Firm* — Nixon Peabody LLP

(57) ABSTRACT

Systems, apparatus and methods for on-the-fly encryption of data storage on a computerized wagering gaming machine are described herein. In some embodiments, a method includes accessing, using an on-the-fly encryption operation, data from a nonvolatile data storage in a computerized wagering gaming machine.

20 Claims, 9 Drawing Sheets

(56) References Cited

U.S. PATENT DOCUMENTS

| | | |
|---|---|---|
| 4,607,844 A | 8/1986 | Fullerton |
| 4,727,544 A | 2/1988 | Brunner et al. |
| 5,155,768 A | 10/1992 | Matsuhara |
| 5,231,668 A | 7/1993 | Kravitz |
| 5,326,104 A | 7/1994 | Pease |
| 5,643,086 A | 7/1997 | Alcorn et al. |
| 5,644,704 A | 7/1997 | Pease et al. |
| 5,668,945 A | 9/1997 | Ohba |
| 5,707,286 A | 1/1998 | Carlson |
| 5,737,418 A | 4/1998 | Saffari |
| 5,768,382 A | 6/1998 | Schneier et al. |
| 5,871,398 A | 2/1999 | Schneier |
| 5,970,143 A | 10/1999 | Schneier et al. |
| 5,971,851 A | 10/1999 | Pascal |
| 6,071,190 A | 6/2000 | Weiss et al. |
| 6,099,408 A | 8/2000 | Schneier et al. |
| 6,106,396 A | 8/2000 | Alcorn et al. |
| 6,108,583 A * | 8/2000 | Schneck et al. ............ 700/9 |
| 6,149,522 A | 11/2000 | Alcorn et al. |
| 6,203,427 B1 | 3/2001 | Walker et al. |
| 6,264,557 B1 | 7/2001 | Schneier et al. |
| 6,364,769 B1 | 4/2002 | Weiss et al. |
| 6,402,614 B1 | 6/2002 | Schneier |
| 6,409,602 B1 | 6/2002 | Wiltshire et al. |
| 6,450,885 B2 | 9/2002 | Schneier et al. |
| 6,488,581 B1 | 12/2002 | Stockdale |
| 6,527,638 B1 | 3/2003 | Walker et al. |
| 6,565,443 B1 | 5/2003 | Johnson et al. |
| 6,595,856 B1 | 7/2003 | Ginsburg et al. |
| 6,607,439 B2 | 8/2003 | Schneier |
| 6,620,047 B1 | 9/2003 | Alcorn et al. |
| 6,629,184 B1 | 9/2003 | Berg |
| 6,645,077 B2 | 11/2003 | Rowe |
| 6,675,152 B1 | 1/2004 | Prasad |
| 6,685,567 B2 | 2/2004 | Cockerille et al. |
| 6,702,672 B1 | 3/2004 | Angell et al. |
| 6,722,986 B1 | 4/2004 | Lyons et al. |
| 6,823,419 B2 | 11/2004 | Berg |
| 6,875,109 B2 | 4/2005 | Stockdale |
| 6,918,831 B2 | 7/2005 | Nguyen |
| 6,926,605 B2 | 8/2005 | Nguyen |
| 6,935,952 B2 | 8/2005 | Walker |
| 6,942,570 B2 | 9/2005 | Schneier |
| 6,962,530 B2 | 11/2005 | Jackson |
| 6,964,611 B2 | 11/2005 | Packes, Jr. |
| 6,968,787 B2 | 11/2005 | Heidel et al. |
| 7,008,318 B2 | 3/2006 | Schneier |
| 7,043,641 B1 | 5/2006 | Martinek |
| 7,062,470 B2 | 6/2006 | Prasad |
| 7,063,615 B2 | 6/2006 | Alcorn |
| RE39,368 E | 10/2006 | Alcorn |
| RE39,369 E | 10/2006 | Alcorn |
| RE39,370 E | 10/2006 | Alcorn |
| 7,116,782 B2 | 10/2006 | Jackson et al. |
| 7,125,017 B2 | 10/2006 | LaPorte |
| RE39,400 E | 11/2006 | Alcorn |
| RE39,401 E | 11/2006 | Alcorn |
| 7,137,893 B2 | 11/2006 | Canterbury |
| 7,162,036 B2 | 1/2007 | Rowe |
| 7,177,428 B2 | 2/2007 | Gordon |
| 7,179,170 B2 | 2/2007 | Martinek et al. |
| 7,490,352 B2 * | 2/2009 | Kramer et al. ............. 726/22 |
| 7,491,122 B2 | 2/2009 | Ryan |
| 7,496,200 B2 | 2/2009 | Multerer et al. |
| 7,549,922 B2 | 6/2009 | Falvey et al. |
| 7,570,781 B2 | 8/2009 | Rhoads et al. |
| 7,600,108 B2 | 10/2009 | Gentles |
| 2002/0049909 A1 | 4/2002 | Jackson et al. |
| 2002/0133707 A1 | 9/2002 | Newcombe |
| 2002/0194209 A1 * | 12/2002 | Bolosky et al. ............ 707/205 |
| 2003/0008704 A1 | 1/2003 | Gauselmann |
| 2003/0014639 A1 * | 1/2003 | Jackson et al. ............. 713/181 |
| 2003/0028779 A1 | 2/2003 | Rowe |
| 2003/0195033 A1 | 10/2003 | Gazdic et al. |
| 2003/0203755 A1 * | 10/2003 | Jackson ...................... 463/42 |
| 2003/0203756 A1 | 10/2003 | Jackson |
| 2004/0002381 A1 | 1/2004 | Alcorn |
| 2004/0038740 A1 | 2/2004 | Muir |
| 2004/0043820 A1 | 3/2004 | Schlottmann |
| 2004/0127277 A1 | 7/2004 | Walker et al. |
| 2004/0177257 A1 * | 9/2004 | Fujinawa et al. ........... 713/189 |
| 2004/0198494 A1 * | 10/2004 | Nguyen et al. ............. 463/42 |
| 2004/0243848 A1 | 12/2004 | Blackburn et al. |
| 2004/0248646 A1 * | 12/2004 | Canterbury ................. 463/29 |
| 2004/0259633 A1 | 12/2004 | Gentles et al. |
| 2004/0259643 A1 | 12/2004 | Gentles |
| 2005/0009599 A1 | 1/2005 | Ryan |
| 2005/0020356 A1 * | 1/2005 | Cannon ....................... 463/29 |
| 2005/0138378 A1 * | 6/2005 | Pourzandi et al. ........... 713/170 |
| 2005/0143171 A1 | 6/2005 | Loose |
| 2005/0227769 A1 | 10/2005 | Morrow et al. |
| 2006/0035703 A1 | 2/2006 | Nguyen |
| 2006/0035708 A1 | 2/2006 | Nguyen |
| 2006/0161761 A1 * | 7/2006 | Schwartz et al. ........... 711/216 |
| 2006/0211490 A1 | 9/2006 | Falvey |
| 2006/0211491 A1 | 9/2006 | Falvey |
| 2006/0240888 A1 | 10/2006 | Tanimura |
| 2006/0247004 A1 | 11/2006 | Tanimura |
| 2006/0247005 A1 | 11/2006 | Tanimura |
| 2006/0247020 A1 | 11/2006 | Fujimori |
| 2007/0021194 A1 | 1/2007 | Aida |
| 2007/0021195 A1 | 1/2007 | Campbell et al. |
| 2007/0026942 A1 | 2/2007 | Kinsley et al. |
| 2007/0220500 A1 * | 9/2007 | Saunier ...................... 717/162 |

FOREIGN PATENT DOCUMENTS

| | | |
|---|---|---|
| GB | 2121569 A | 12/1983 |
| WO | WO-9965579 A1 | 12/1999 |
| WO | WO-0033196 A1 | 6/2000 |
| WO | WO-2005029272 A2 | 3/2005 |
| WO | WO-2005098767 A1 | 10/2005 |
| WO | WO-2006099234 A1 | 9/2006 |

OTHER PUBLICATIONS

.."Written Opinion of the International Searching Authority for Application No. PCT/US2006/31756, date mailed May 10, 2007", 7 pgs.

* cited by examiner

ON-THE-FLY ENCRYPTION ON A GAMING MACHINE

RELATED APPLICATIONS

This application is a U.S. National Stage Filing under 35 U.S.C. 371 from International Patent Application Serial No. PCT/US2006/031756, filed Aug. 15, 2006, and published on Mar. 8, 2007 as WO 2007/027427 A2, and republished as WO 2007/027427 A3, which claims the priority benefit of U.S. Provisional Application Ser. No. 60/712,321, filed Aug. 29, 2005, the contents of which are incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

BACKGROUND

1. Field

This invention relates generally to the field of computerized wagering gaming machines and more particularly to the field of on-the-fly encryption of data storage on a computerized wagering gaming machine.

2. Description of Related Art

Casino gaming machines are subjected to rigorous regulation. These regulations are designed to eliminate or at the very least reduce fraud or cheating, both of the games and of the public. For example, these regulations require that the data content (including the gaming applications) stored on a gaming machine is carefully controlled.

SUMMARY

Systems, apparatus and methods for on-the-fly encryption of data storage on a computerized wagering gaming machine are described herein. In some embodiments, a method includes accessing, using an on-the-fly encryption operation, data from a nonvolatile data storage in a computerized wagering gaming machine.

In some embodiments, a method includes conducting a wagering game on a computerized wagering gaming machine. The conducting of the wagering game includes accessing a file from a secondary storage of the computerized wagering gaming machine, wherein the accessing comprises decrypting the file. The conducting of the wagering game also includes presenting wagering gaming information for the computerized wagering gaming machine based at least in part on data in the file.

In some embodiments, an apparatus includes a secondary storage to store a number of encrypted files in an encrypted container file. The apparatus also includes a processor to execute instructions that includes a wagering game, wherein the instructions include a retrieval and decryption of at least one encrypted file of the number of encrypted files from the secondary storage.

BRIEF DESCRIPTION OF THE FIGURES

The present invention is illustrated by way of example and not limitation in the Figures of the accompanying drawings in which.

DESCRIPTION OF THE EMBODIMENTS

Figure 1:
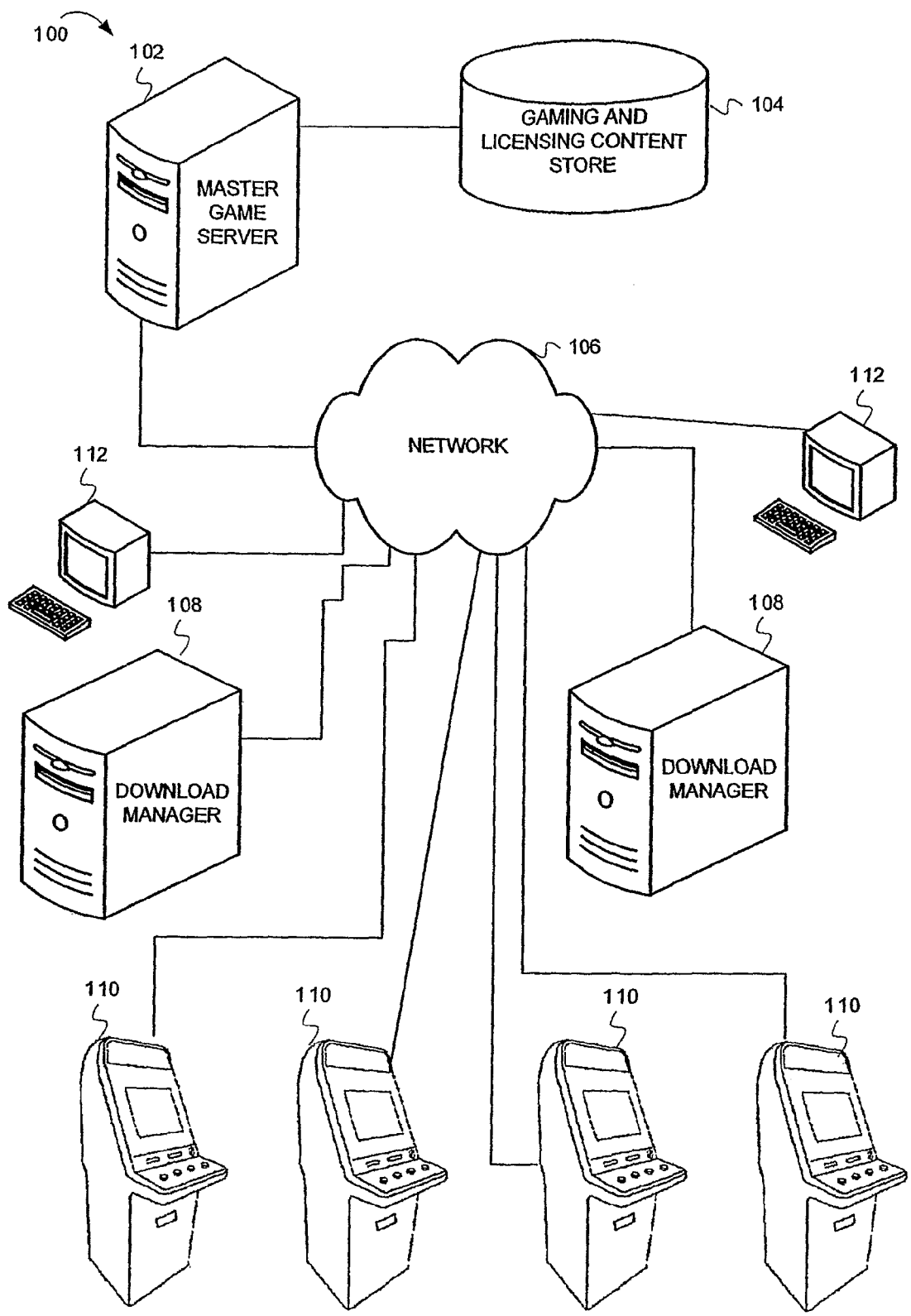
FIG. 1 is a block diagram illustrating a system for on-the-fly encryption of data storage on a computerized wagering gaming machine, according to some embodiments of the invention.

Systems, apparatus and methods for on-the-fly encryption of data storage on a computerized wagering gaming machine are described herein. This description of the embodiments is divided into three sections. The first section describes an overview of some embodiments. The second section describes an example operating environment and system architecture. The third section describes example operations. The fourth section provides some general comments.

Overview of Some Embodiments

In some embodiments, a method comprises accessing, using an on-the-fly encryption operation, data from a nonvolatile data storage in a computerized wagering gaming machine. The accessing, using the on-the-fly encryption operation, of data may comprise retrieving and decrypting a gaming component from the nonvolatile data storage. In some embodiments, the method further comprises executing a gaming application on the computerized wagering gaming machine, wherein executing the gaming application is based at least in part on the gaming component. The gaming component may include a video component. The accessing, using the on-the-fly encryption operation, of data may comprise encrypting and storing the data in the nonvolatile data storage. The accessing, using the on-the-fly encryption operation, of data, may comprise retrieving an individually encrypted file from the nonvolatile data storage and decrypting the individually encrypted file. The accessing, using the on-the-fly encryption operation, of data may comprise verifying the data, wherein the computerized wagering gaming machine is moved to an inoperative state upon determination that the data is not verified. In some embodiments, the data is stored into a number of files on the nonvolatile data storage. The method may further comprise initializing the computerized wagering gaming machine prior to accessing, using on-the-fly encryption operation, the data. In such an embodiment, the initializing may comprise authenticating N percent of each of the number of files. In some embodiments, N is less than 100. N may be different for at least two different files of the number of files, wherein N is dependent on a size of the number of files.

In some embodiments, a method comprises conducting a wagering game on a computerized wagering gaming machine. The conducting includes accessing a file from a secondary storage of the computerized wagering gaming machine, wherein the accessing comprises decrypting the file. The method also includes presenting wagering gaming information for the computerized wagering gaming machine based at least in part on data in the file. The presenting of wagering gaming information may comprise displaying a video symbol for a reel of the computerized wagering gaming machine. The presenting of wagering gaming information may comprise outputting audio from an audio speaker of the computerized wagering gaming machine. The presenting of wagering gaming information may comprise computing a monetary amount for a win on the computerized wagering gaming machine. In some embodiments, the secondary storage is encrypted as a container file, wherein the conducting further includes opening the container file prior to accessing the file from the secondary storage.

In some embodiments, an apparatus includes a secondary storage to store a number of encrypted files in an encrypted container file. The apparatus also includes a processor to execute instructions that includes a wagering game, wherein the instructions include a retrieval and decryption of at least one encrypted file of the number of encrypted files from the secondary storage. The instructions may include an open operation for the encrypted container file to access the at least one encrypted file. The encrypted file may include video content, wherein the instructions are to display the video content as part of the wagering game. The processor may execute instructions to initialize the apparatus prior to the execution of the instructions that includes the wagering game, wherein the instructions to initialize comprises an authentication of N percent of each of the number of encrypted files. In some embodiments, N is different for at least two different files of the number of encrypted files, wherein N is dependent on a size of the number of encrypted files.

Hardware, Operating Environment and System Architecture

This section provides an example system architecture in which embodiments of the invention can be practiced. This section also describes an example computer system and gaming machine. Operations of the system components will be described in the next section.

Example System Architecture

FIG. 1 is a block diagram illustrating a system for on-the-fly encryption of data storage on a computerized wagering gaming machine, according to some embodiments of the invention. As shown in FIG. 1, a system 100 includes a master game server 102 which is connected to gaming and licensing content store 104. The master game server 102 is also connected to a network 106, which is connected to a pair of download managers 108. Each download manager 108 is connected to an administrator terminal 112 and pair of gaming machines 110.

In some embodiments, the gaming machines 110 may include a data storage, including any type of nonvolatile memory (such as a hard drive), that is accessed using on-the-fly encryption operations. Accordingly, the data stored on the data storage is encrypted and is decrypted as part of the retrieval of data there from. Therefore, data (such as gaming and licensing content) downloaded from the master game server 102 into the gaming machines 110 may be encrypted prior to storage therein.

The gaming and licensing content store 104 includes gaming content and licensing content. The gaming content can include instructions and/or data used for conducting casino style wagering games (e.g., video slots, video poker, video black jack, and the like). In some embodiments, the gaming content may include program code, audio content, video content, and/or other data used for conducting all or part of a casino style slots game and/or bonus events.

The licensing content may include data and/or instructions for enforcing a license for using gaming content. In some embodiments, the licensing content may be used to enforce any suitable licensing model.

In some embodiments, the master game server 102 distributes gaming and licensing content to the download managers 108. The download managers 108 may manage delivery of the gaming and licensing content to the gaming machines 110. In some embodiments, the master game server 202 distributes gaming and licensing content using one or more data packages, as described in greater detail below (see System Operations section).

In some embodiments, each gaming machine 110 serves as a thin client to a download manager 108 or other computer system. As a thin client, each gaming machine 110 includes logic for presenting and receiving gaming information, while logic for conducting games is disposed within the download manager 108 or other computer system (not shown). In another embodiment, the gaming machine 110 includes all logic for presenting and receiving gaming information and for conducting a game. The gaming machines 110 may be embodied in any suitable computing device, such as a desktop computer, laptop computer, or personal digital assistant.

The components of the system 100 may be connected using any suitable connection technology. For example, the components can be connected via RS-232, Ethernet, 802.11, public switched telephone networks, DSL, or any other connection technology. The network 120 may be a local area network or wide-area network and can transmit licensing and gaming content using any suitable communication protocols. The administrator terminals 112 may be used for configuring and accessing licensing and gaming content stored in the download managers 108.

In some embodiments, the data downloaded into the gaming machines 110 may be encrypted using on-the-fly encryption operation. In some embodiments, on-the-fly encryption is defined such that data is encrypted or decrypted right before such data is loaded (saved) or retrieved, respectively, from the data storage device, without user intervention. No data stored on an encrypted volume may be read without the correct password or encryption key. In some embodiments, the data that is decrypted is loaded into volatile memory for access thereto. In some embodiments, the data from the data storage is not written to a nonvolatile memory (such as a different hard disk).

Figure 2:
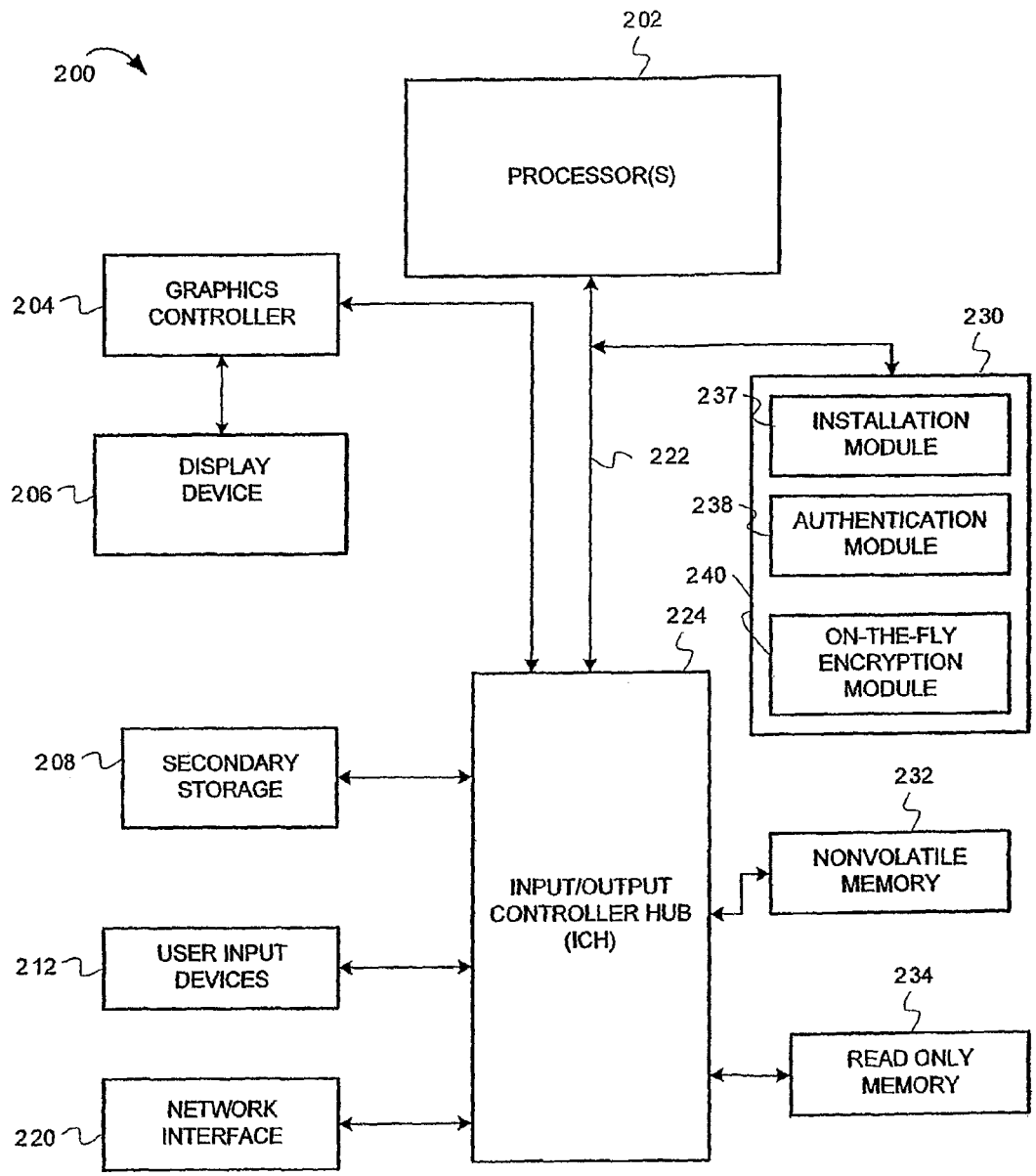
FIG. 2 illustrates parts of a computerized wagering gaming machine that includes on-the-fly encryption of data storage, according to some embodiments of the invention.
Figure 3:
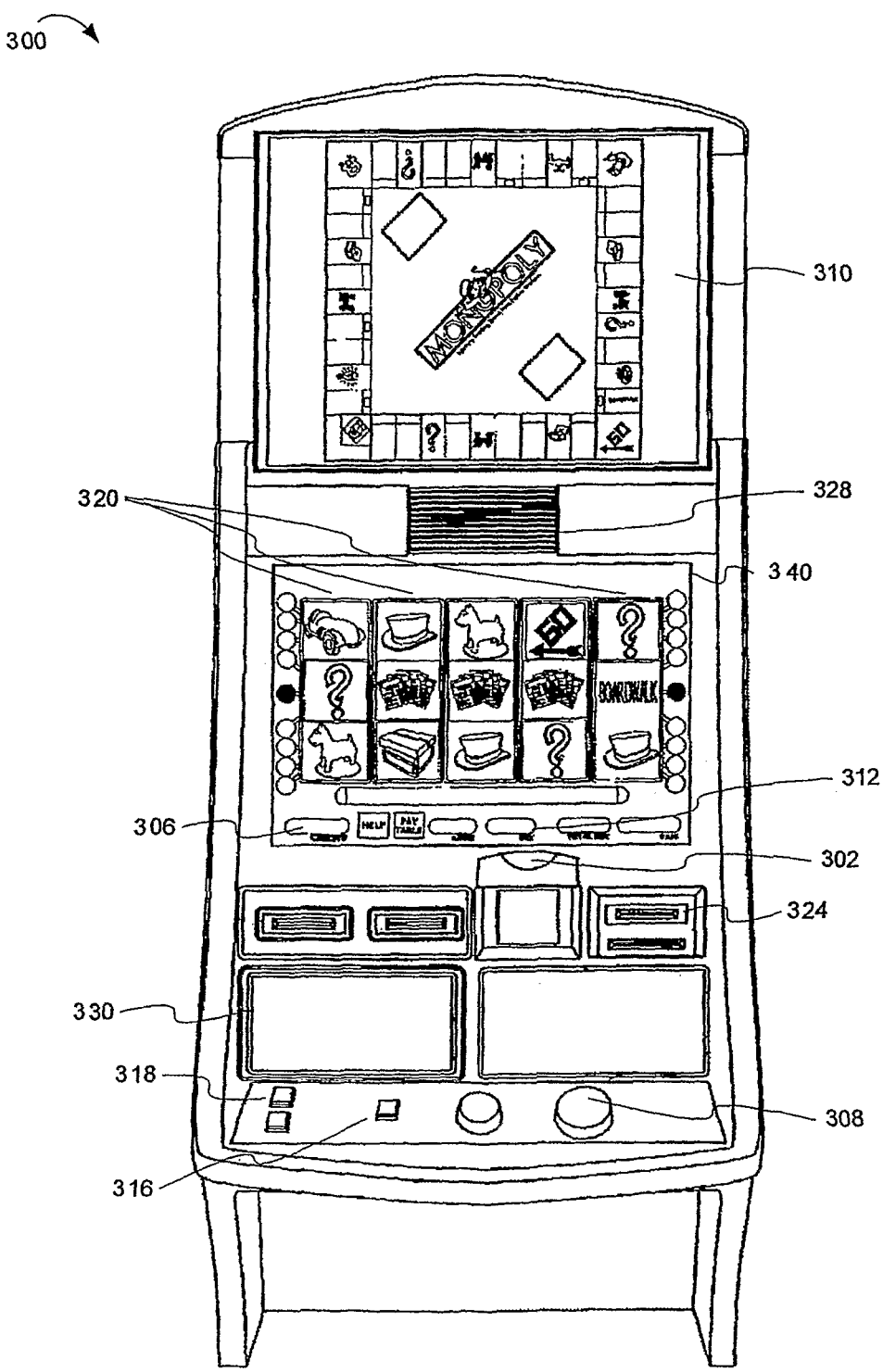
FIG. 3 is a perspective view of a gaming machine, according to some embodiments of the invention.
Figure 4:
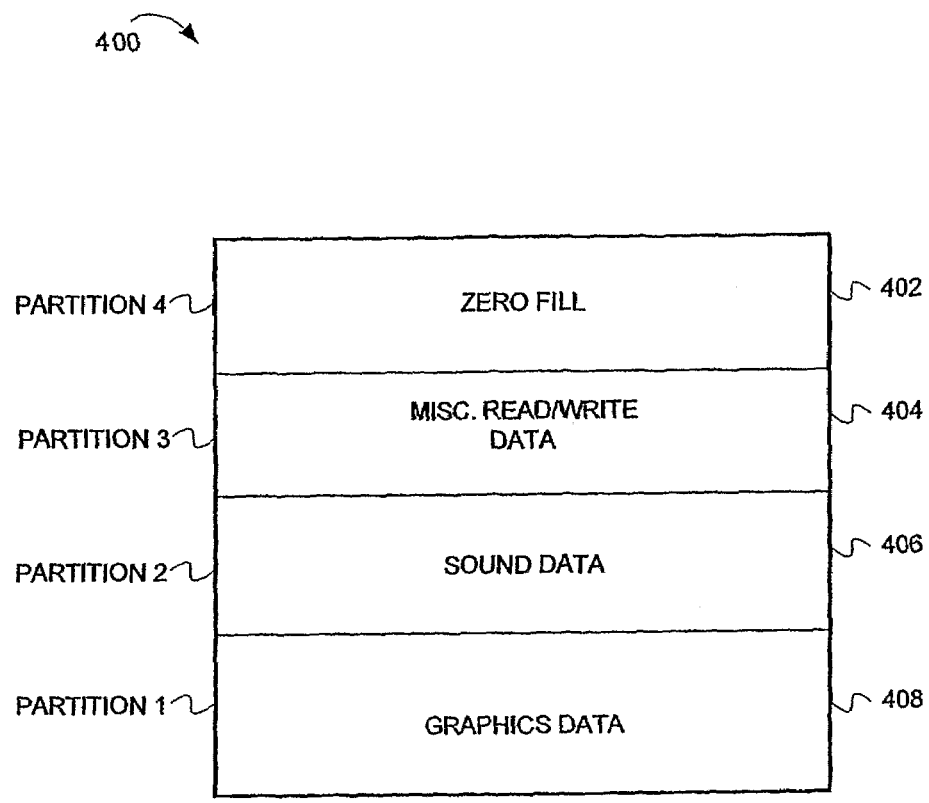
FIG. 4 illustrates a secondary storage of a gaming machine, according to some embodiments of the invention.

While FIG. 1 describes a system for distributing gaming content that may be used in conjunction with on-the-fly encryption of data in a data storage of a gaming machine, FIG. 2 illustrates parts of a gaming machine that may be used for on-the-fly encryption. FIG. 3 illustrates a perspective view of a gaming machine. FIG. 4 illustrates a secondary storage in a gaming machine that may be used for on-the-fly encryption.

Figure 5:
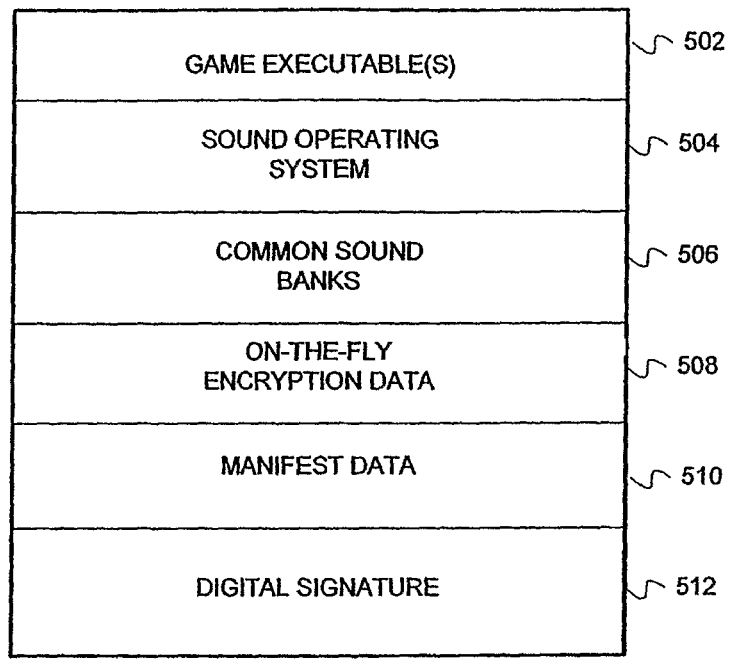
FIG. 5 illustrates a nonvolatile memory of a gaming machine used for dynamic encryption of data in a preloaded secondary storage of the gaming machine, according to some embodiments of the invention.
Figure 6:
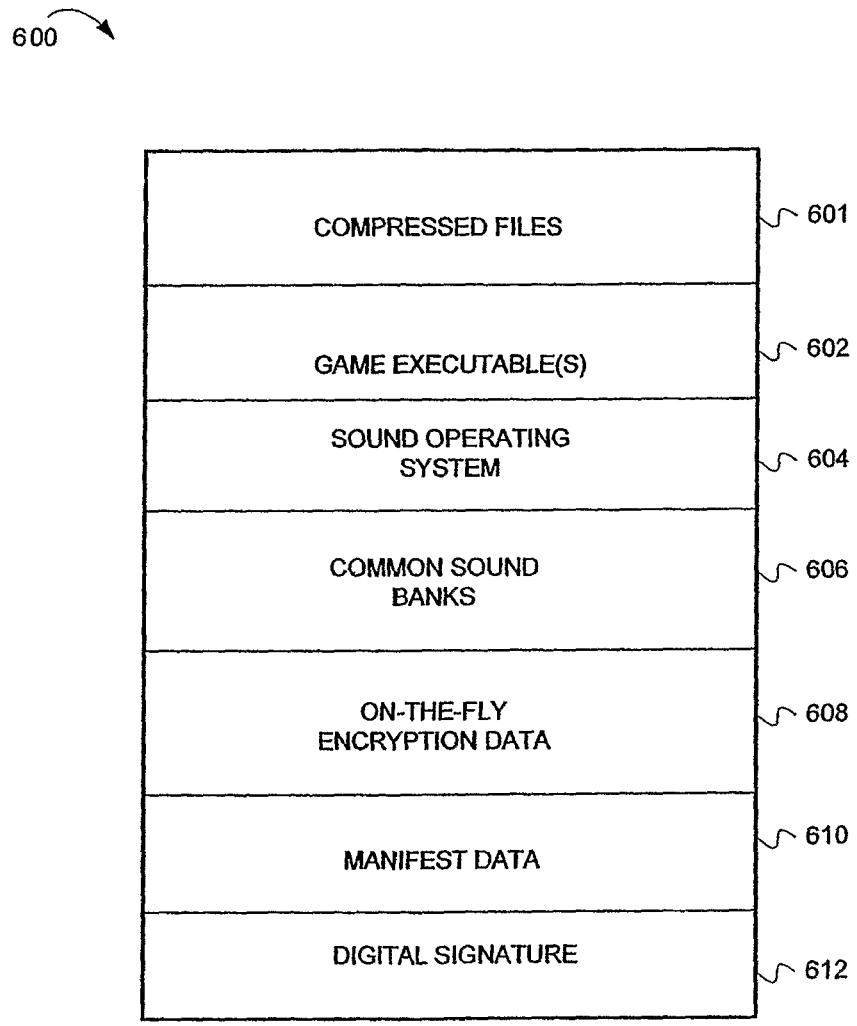
FIG. 6 illustrates a nonvolatile memory of a gaming machine used for dynamic encryption of data in a non-preloaded secondary storage of the gaming machine, according to some embodiments of the invention.

FIGS. 5 and 6 illustrate a nonvolatile memory in a gaming machine that may be used for on-the-fly encryption.

Example Computer System and Gaming Machine

FIG. 2 illustrates parts of a computerized wagering gaming machine that includes on-the-fly encryption of data storage, according to some embodiments of the invention. As illustrated in FIG. 2, the computer system 200 comprises processor(s) 202. The computer system 200 may be representative of an architecture within a gaming machine 110.

The computer system 500 also includes a volatile memory 230, processor bus 222, and an Input/Output (I/O) controller hub (ICH) 224. The processor(s) 202, the volatile memory 230, and the ICH 224 are coupled to the processor bus 222. The processor(s) 202 may comprise any suitable processor architecture. The computer system 200 may comprise one, two, three, or more processors, any of which may execute a set of instructions in accordance with embodiments of the invention.

The volatile memory 230 may store data and/or instructions, and may comprise any suitable memory, such as a dynamic random access memory (DRAM). For example, as shown, the volatile memory 230 may store an installation module 237, an authentication module 238 and an on-the-fly encryption module 240. As shown, the installation module 237, the authentication module 238 and the on-the-fly encryption module 240 may be instructions that may be executed by the processor(s) 202. However, in some embodiments, the installation module 237, the authentication module 238 and the on-the-fly encryption module 240 may be representative of hardware, firmware or a combination thereof. The operations of the installation module 237, the authentication module 238 and the on-the-fly encryption module 240 are described in more detail below (see System Operations section).

A graphics controller 204 controls the display of information on a display device 206, according to some embodiments of the invention. The computer system also includes a nonvolatile memory 232 and a read-only memory (ROM) 234 that are coupled to the ICH 224. The nonvolatile memory 232 may be Static Random Access Memory (SRAM), flash memory, etc. The ROM 234 may be Programmable ROM (PROM), Erasable PROM (EPROM), Electrically Erasable PROM (EEPROM), etc. Some embodiments of the nonvolatile memory 232 are illustrated in FIGS. 5 and 6, which are described in more detail below. The ROM 234 may store a container encryption key used to access one or more containers that stores the data in the secondary storage 208 (as further described below). Accordingly, to access the data in the secondary storage 208, the secondary storage 208 is required to be part of this particular gaming machine having this ROM 234.

The ICH 224 provides an interface to I/O devices or peripheral components for the computer system 200. The ICH 224 may comprise any suitable interface controller to provide for any suitable communication link to the processor(s) 202, the volatile memory 230 and/or to any suitable device or component in communication with the ICH 224. In some embodiments, the ICH 224 provides suitable arbitration and buffering for each interface.

For some embodiments of the invention, the ICH 224 provides an interface to a secondary storage 208 (which may be any type of nonvolatile data storage), such as a hard disk drive (HDD) or compact disc read only memory (CD ROM) drive, or to suitable universal serial bus (USB) devices through one or more USB ports. The secondary storage 208 may be read only, read/write, etc. In some embodiments, the data stored in the secondary storage 208 is encrypted. In some embodiments, access of such data may be performed using on-the-fly encryption. Accordingly, as part of the retrieval of data from the secondary storage 208, the data is decrypted. As part of the storage of data into the secondary storage 208, the data is encrypted. Therefore, individual files may be encrypted. Such encryption may be based on the same or separate encryption keys. For example, in some embodiments, each file may have an associated encryption key. Examples of the types of encryption may include different types of asymmetric key and symmetric key encryption. The data may be encrypted in accordance with different Data Encryption Standards (DES), the Rivest, Shaman and Adelman (RSA) algorithm, etc.

Moreover, in some embodiments, the entire secondary storage 208 and/or a partition therein may be encrypted. The encryption may be based on on-the-fly encryption operations. The encryption may be based on a number of different hashing operations (e.g., Secure Hashing Algorithm (SHA), RACE Integrity Primitives Message Digest (RIPEMD), etc.). Thus, individual files may be encrypted and the individual files as a group may be encrypted. Accordingly, the entire secondary storage 208 may be a single encrypted file until the secondary storage 208 is decrypted. Subsequently, the individual files may then be decrypted for access thereto.

For some embodiments, the ICH 224 also provides an interface different user input devices 212 (button panels, keyboard, etc.). For some embodiments, the ICH 224 also provides a network interface 220 though which the computer system 200 may communicate with other computers and/or devices.

In some embodiments, the computer system 200 may be employed as the gaming machine 110. In some embodiments, the computer system 200 includes a machine-readable medium that stores a set of instructions (e.g., software) embodying any one, or all, of the methodologies for on-the-fly encryption of data stored in a gaming machine described herein. Furthermore, software may reside, completely or at least partially, within memory unit 230 and/or within the processor(s) 202.

While FIG. 2 describes a computer system that may be used in conjunction with embodiments of the invention. FIG. 3 describes embodiments of a gaming machine that may be used with embodiments of the invention. FIG. 3 is a perspective view of a gaming machine, according to exemplary embodiments of the invention. As shown in FIG. 3, the gaming machine 300 can be a computerized slot machine having the controls, displays, and features of a conventional slot machine.

The gaming machine 300 can be operated while players are standing or seated. Additionally, the gaming machine 300 is preferably mounted on a stand (not shown). However, it should be appreciated that the gaming machine 300 can be constructed as a pub-style tabletop game (not shown), which a player can operate while sitting. The gaming machine 300 may also be in the form of a handheld device. For example, the gaming machine 300 may be part of a Personal Digital Assistant (PDA), cellular telephone, etc. Furthermore, the gaming machine 300 can be constructed with varying cabinet and display designs. The gaming machine 300 can incorporate any primary game such as slots, poker, or keno, and additional bonus round games. The symbols and indicia used on and in the gaming machine 300 can take mechanical, electrical, or video form.

As illustrated in FIG. 3, the gaming machine 300 includes a coin slot 302 and bill acceptor 324. Players can place coins in the coin slot 302 and paper money or ticket vouchers in the bill acceptor 324. Other devices can be used for accepting payment. For example, credit/debit card readers/validators can be used for accepting payment. Additionally, the gaming machine 300 can perform electronic funds transfers and financial transfers to procure monies from financial accounts. When a player inserts money in the gaming machine 300, a number of credits corresponding to the amount deposited are shown in a credit display 306. After depositing the appropriate amount of money, a player can begin playing the game by pushing play button 308. The play button 308 can be any play activator used for starting a wagering game or sequence of events in the gaming machine 300.

As shown in FIG. 3, the gaming machine 300 also includes a bet display 312 and a "bet one" button 316. The player places a bet by pushing the bet one button 316. The player can increase the bet by one credit each time the player pushes the bet one button 316. When the player pushes the bet one button 316, the number of credits shown in the credit display 306 decreases by one credit, while the number of credits shown in the bet display 312 increases by one credit.

A player may "cash out" by pressing a cash out button 318. When a player cashes out, the gaming machine 300 dispenses a voucher or currency corresponding to the number of remaining credits. The gaming machine 300 may employ other payout mechanisms such as credit slips (which are redeemable by a cashier) or electronically recordable cards (which track player credits), or electronic funds transfer.

The gaming machine also includes a primary display unit 304 and a secondary display unit 310 (also known as a "top box"). The gaming machine may also include an auxiliary video display 340. In one embodiment, the primary display unit 304 displays a plurality of video reels 320. According to embodiments of the invention, the display units 304 and 310 can include any visual representation or exhibition, including moving physical objects (e.g., mechanical reels and wheels), dynamic lighting, and video images. In one embodiment, each reel 320 includes a plurality of symbols such as bells, hearts, fruits, numbers, letters, bars or other images, which correspond to a theme associated with the gaming machine 300. Furthermore, as shown in FIG. 3, the gaming machine 300 includes an audio presentation unit 328. The audio presentation unit 328 can include audio speakers or other suitable sound projection devices.

In some embodiments, the gaming machine 300 may include a data storage, including any type of nonvolatile memory (such as a hard drive), that is accessed using on-the-fly encryption operations. Accordingly, the data stored on the data storage is encrypted and is decrypted as part of the retrieval of data there from.

In some embodiments, a plurality of gaming machines can be connected to a plurality of download managers in a gaming network. Additionally, the gaming machines can conduct casino style wagering games based on the gaming content.

FIG. 4 illustrates a secondary storage of a gaming machine, according to some embodiments of the invention. In particular, FIG. 4 illustrates a secondary storage 400 that may be representative of the secondary storage 208 (shown in FIG. 2). The secondary storage 400 is divided into four different partitions (partitions 1-4). Partition 1 (408) may store different types of graphics data, such as video components, images, etc., which may be used for different games executed on the gaming machine 110. Partition 2 (406) may store different types of audio components, such as audio clips, which may be used for different games executed on the gaming machine 110. Partition 3 (404) may store miscellaneous read/write data used by the gaming machine 110. For example, partition 3 may store different gaming components, game executables, tables of transactions of the games, player profiles, etc. In some embodiments, partition 3 may store an authorization table for the secondary storage 400. The authorization table may track the accessing of data from the secondary storage 400. For example, the authorization table may store the following information for a file written to the secondary storage 400: (1) file name, (2) date/time created, (3) type of file, (4) validation type used for the file, (5) whether the file is closed/not closed, etc. Once a file is written to the secondary storage 400, the file becomes closed. If the write operation is not completed, the file remains unclosed. Partition 4 (402) is zero fill. Therefore as part of the validity of the gaming machine 110, partition 4 may be queried periodically to determine if there is any non-zero data therein. If partition 4 does contain non-zero, an error may be generated (which may cause the gaming machine 110 to go to an inoperative state, the transmission of an error to the master game server 102 over the network, etc.).

As described above, some embodiments include a nonvolatile memory 232 that may be used. Two different embodiments of the nonvolatile memory 232 are now described. A first embodiment and a second embodiment may be used in a gaming machine 110 wherein the data is preloaded and is not preloaded, respectively, on the secondary storage 208.

FIG. 5 illustrates a nonvolatile memory of a gaming machine used for on-the-fly encryption of data that is preloaded on a secondary storage of the gaming machine, according to some embodiments of the invention. The nonvolatile memory 500 includes game executable(s) 502, a sound operating system 504, common sound banks 506, on-the-fly encryption data 508, manifest data 510 and a digital signature 512.

The game executable(s) 502 are the different games that may be executed on the gaming machine 110. The sound operating system 504 includes the instructions for control of common sounds used for the gaming machine 110 across a number of different game applications. The common sound banks 506 are the common audio data used for the gaming machine 110 and controlled by the sound operating system 504.

The on-the-fly encryption data 508 may include file encryption keys for the files stored on the secondary storage 208. In some embodiments, each file may have its own file encryption key. The manifest data 510 may include a file identification, a size of the file for each file stored on the secondary storage 208. Accordingly, each file on the secondary storage 208 is separately encrypted. The on-the-fly encryption operations may use such keys to encrypt and decrypt the files stored on the secondary storage 208. The digital signature 512 is a signature representative of the other data in the nonvolatile memory 500 so that such data may be verified.

FIG. 6 illustrates a nonvolatile memory of a gaming machine used for on-the-fly encryption of data that is not preloaded on a secondary storage of the gaming machine, according to some embodiments of the invention. The nonvolatile memory 600 includes compressed files 601, game executable(s) 602, a sound operating system 604, common sound banks 606, on-the-fly encryption data 608, manifest data 610 and a digital signature 612.

The compressed files 601 may be compressed data that is decompressed and loaded onto the secondary storage 208. Accordingly, the data shown in FIG. 4 for the secondary storage 208 may be stored in a compressed format as compressed files 601. The operations of loading this compressed data onto the secondary storage 208 is described in more detail below. The game executable(s) 602, the sound operating system 604, the common sound banks 606, the on-the-fly encryption data 608, the manifest data 610 and the digital signature 612 are similar to the game executable(s) 502, the sound operating system 504, the common sound banks 506, the on-the-fly encryption data 508, the manifest data 510 and the digital signature 512 (shown in FIG. 5).

While FIGS. 5 and 6 illustrates different data stored on the nonvolatile memory 500/600, in some embodiments, some or all of this data may be stored in other machine-readable mediums (e.g., the secondary storage 208). For example, the game executable(s) may be downloaded from the master game server 102 over the network for storage in the secondary storage 208. Other data may be pre-loaded onto the secondary storage 208 and/or downloaded from the master game server 102 over the network.

System Operations

This section describes operations performed by embodiments of the invention. In certain embodiments, the operations are performed by instructions residing on machine-readable media (e.g., software), while in other embodiments, the methods are performed by hardware or other logic (e.g., digital logic).

Figure 7:
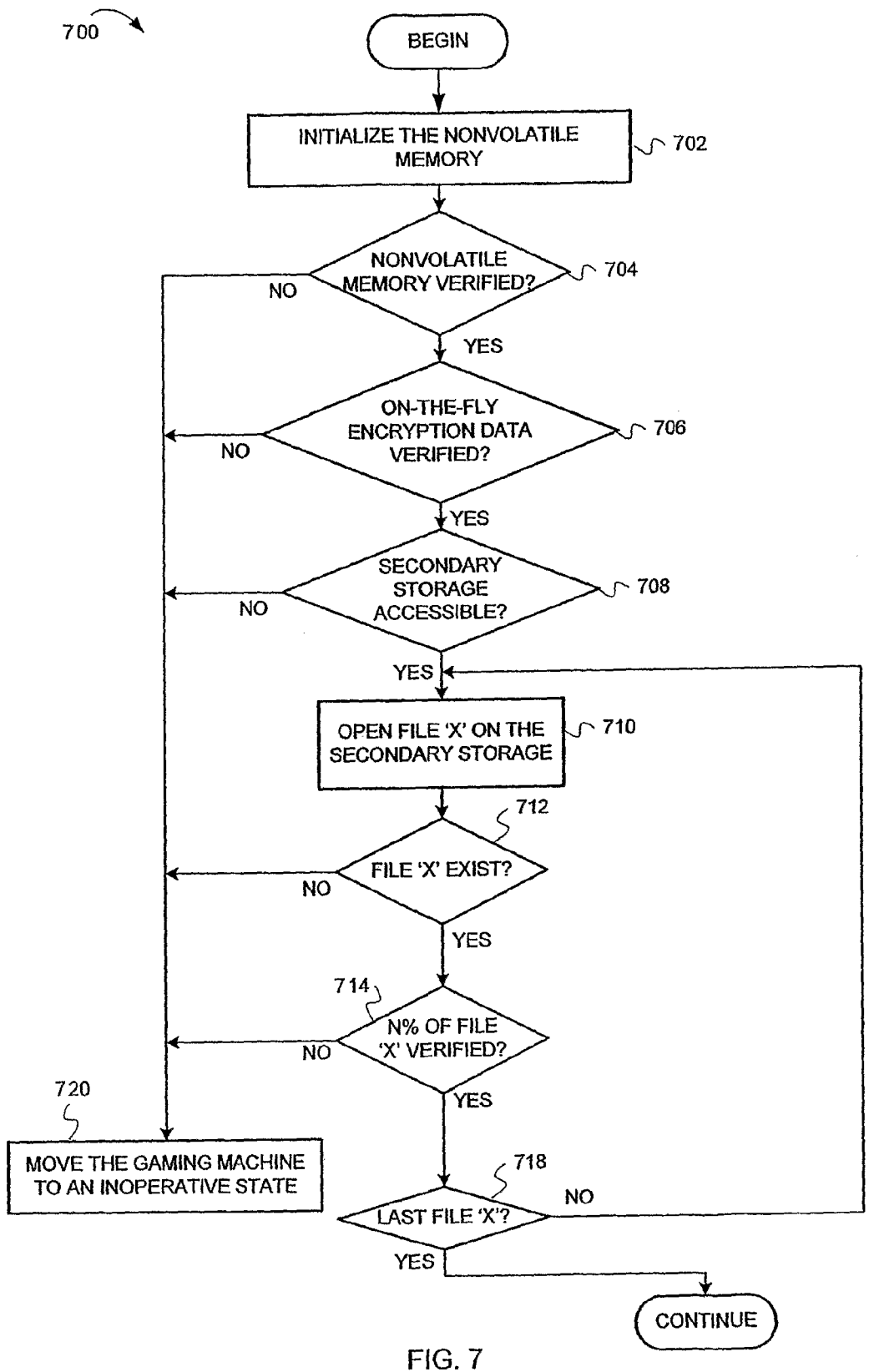
FIG. 7 illustrates a flow diagram for post-boot authentication of data stored on a secondary storage of a gaming machine, according to some embodiments of the invention.
Figure 8:
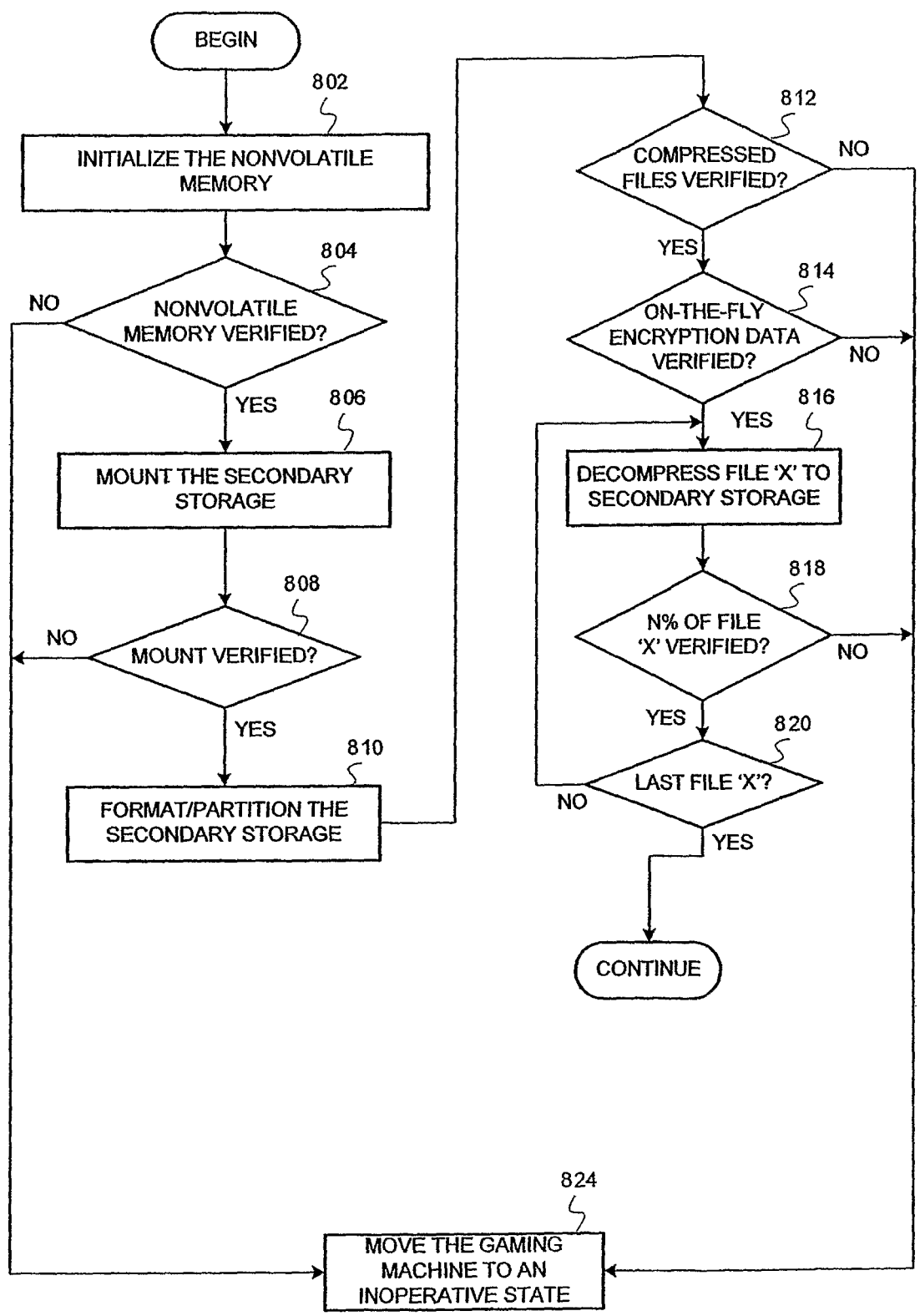
FIG. 8 illustrates a flow diagram for installation of data in a secondary storage used for dynamic encryption of data stored therein, according to some embodiments of the invention.
Figure 9:
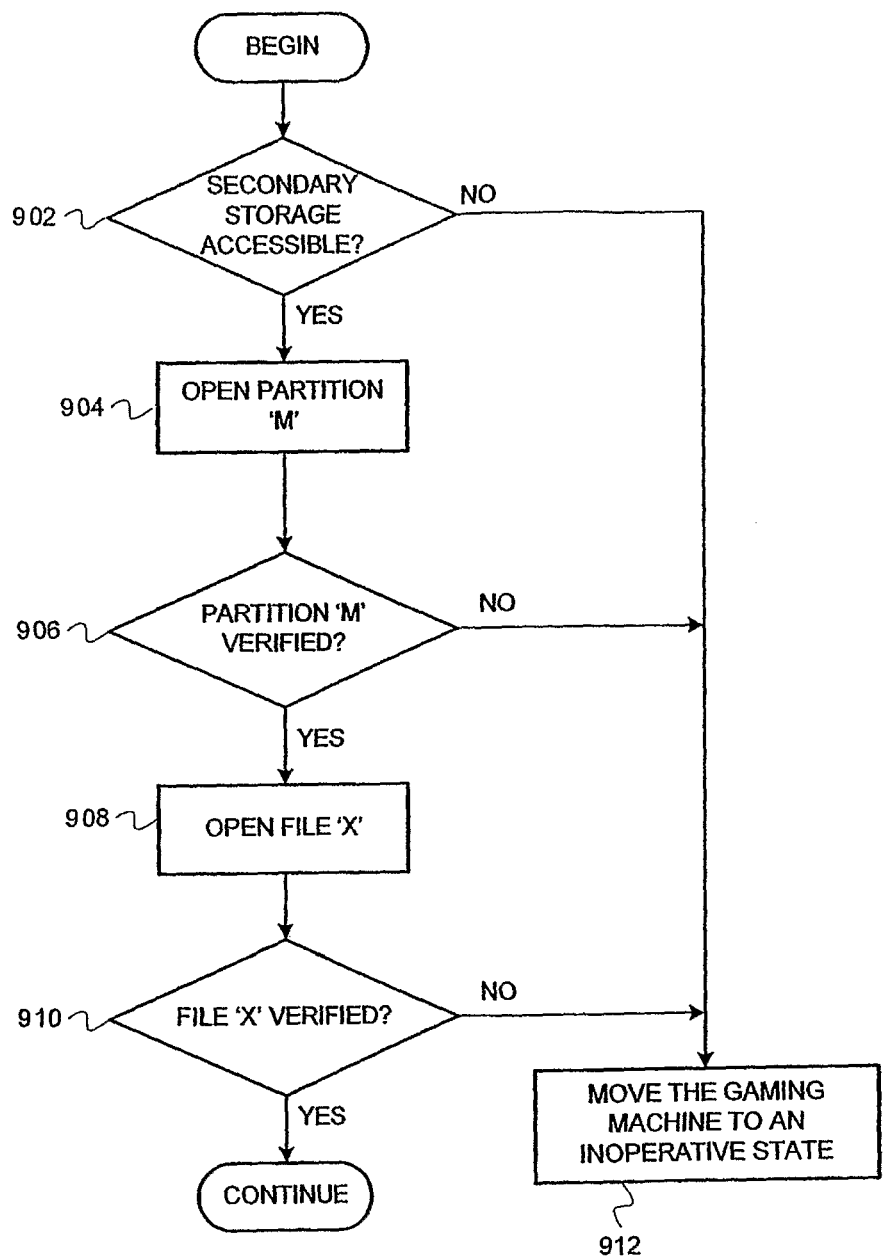
FIG. 9 illustrates a flow diagram for on-the-fly encryption of data stored in a secondary storage in a gaming machine, according to some embodiments of the invention.

In this section, FIGS. 7-9 are discussed. In particular, FIG. 7 describes operations for post-boot authentication of data stored on a secondary storage of a gaming machine, according to some embodiments of the invention. FIG. 8 describes operations for installation of data on a secondary storage of a gaming machine, according to some embodiments of the invention. FIG. 9 describes operations for on-the-fly encryption of data stored in a secondary storage in a gaming machine, according to some embodiments of the invention. This description proceeds with a discussion of FIG. 7.

FIG. 7 illustrates a flow diagram for post-boot authentication of data stored on a secondary storage of a gaming machine, according to some embodiments of the invention. FIG. 7 illustrates operations that may be executed by the gaming machine 110. The flow diagram 700 may be executed for secondary storage having data that is pre-loaded. Alternatively, the flow diagram 700 may be executed on a gaming machine 110 wherein data is installed on the secondary storage 208 subsequent to distribution of the gaming machine from the manufacturer. For example, the data may be installed from data stored on a nonvolatile memory (such as a flash card) locally in the gaming machine 110 and/or distributed over a network (as described above). The flow diagram 700 is described with reference to authenticating data that is on a nonvolatile memory in the gaming device 110. Such data is then used for on-the-fly encryption of data storage on a secondary storage of the gaming machine 110. However, embodiments are not so limited. For example, in some embodiments, instead of the data being on the nonvolatile memory, such data may be downloaded over the network from the master game server 102 (shown in FIG. 1). Such data may be then authenticated in accordance with the operations described in the flow diagram 700. The flow diagram 700 will be described with reference to FIGS. 1-5. The flow diagram 700 commences at block 702.

At block 702, the nonvolatile memory is initialized. In some embodiments, the authentication module 238 performs this initialization. This initialization may include verification that the nonvolatile memory 232 is accessible. The flow continues at block 704.

At block 704, a determination is made of whether the nonvolatile memory is verified. In some embodiments, the authentication module 238 may perform the verification. This verification may include may include authentication of the contents of the nonvolatile memory 232 based on the digital signature 512 that is appended thereto (as shown in FIG. 5). The authentication module 238 may compute a digital signature of the game executable(s) 502, the sound operating system 504, the common sound banks 506, the on-the-fly encryption data 508 and the manifest data 510. The authentication module 238 may verify the nonvolatile memory 232 based on a comparison this computed digital signature to the digital signature 512. If the two digital signatures are equal, the nonvolatile memory 232 may be considered verified. If the nonvolatile memory 232 is not verified, the flow continues at block 720 (wherein the gaming machine is moved to an inoperative state, as described below). Otherwise, the flow continues at block 706.

At block 706, a determination is made of whether the on-the-fly encryption data is verified. In some embodiments, the authentication module 238 may perform the verification. The authentication module 238 may verify that a particular on-the-fly encryption file exists and that such file includes a correct number of encryption keys. For example, in some embodiments, an on-the-fly encryption file may include a file encryption key for the files on the secondary storage 208. If the on-the-fly encryption data is not verified, the flow continues at block 720. Otherwise, the flow continues at block 708.

At block 708, a determination is made of whether the secondary storage is accessible. In some embodiments, the authentication module 238 may make the determination of whether the secondary storage 208 is accessible. For example, the authentication module 238 may perform a test read and/or test write to the secondary storage 208. If the secondary storage is not accessible, the flow continues at block 720. Otherwise, the flow continues at block 710.

At block 710, a file 'X' on the secondary storage is opened. In some embodiments, the authentication module 238 may open the file 'X' on the secondary storage 208. As further described below, the operations at blocks 710, 712, 714 and 716 may be performed for each file 'X' on the secondary storage 208. Accordingly, the authentication module 238 may traverse the files on the secondary storage 208 to perform such operations. In some embodiments, the data on the secondary storage 208 may be stored as a single file (known as an encrypted container file or a container). The authentication module 238 may open this single file using encryption key stored in the ROM 234 to allow access to the individual files 'X' on the secondary storage 208. As described above, the individual files 'X' may also be separately encrypted. In some embodiments, each file 'X' has its own encryption key that is stored in the on-the-fly encryption data 608 along with an identification of the associated file. Accordingly, the authentication module 238 may decrypt the file 'X' using the associated encryption key to open the file 'X'. The flow continues at block 712.

At block 712, a determination is made of whether file 'X' exist. In some embodiments, the authentication module 238 may make this determination. After decryption of the file 'X', the authentication module 238 may determine whether a non-zero byte file 'X' exist as a result of the decryption. If the file 'X' does not exist, the flow continues at block 720. Otherwise, the flow continues at block 714.

At block 714, N % of the file 'X' is verified. In some embodiments, the authentication module 238 may perform this verification. N may be 100 or some lesser value. For example, the authentication module 238 may verify 5%, 10%, 25%, 75%, 90%, 100%, etc. of file 'X'. This may be a configurable value. In some embodiments the N may be different for each file 'X' in the secondary storage 208. For example, for large files, a smaller percentage may be verified. The value of N may be stored in the manifest data 610 along with the associated identification of the file. The authentication module 238 may verify based on a digital signature of the file 'X'. The digital signature of the file 'X' may also be stored in the manifest data 610 along with the associated identification of the file. Accordingly, the authentication module 238 may compute a digital signature of N % of the file 'X'. The authentication module 238 may verify the file 'X' based on a comparison this computed digital signature to the stored digital signature. If the two digital signatures are equal, the file 'X' may be considered verified. Therefore, as described, less than all of a given file 'X' may be verified prior to the gaming machine 110 becoming operational. This may enable the gaming machine 110 to become operational faster in comparison to operations wherein 100% of each file 'X' is verified. As further described below, in some embodiments, prior to actual usage of a given file 'X', 100% of the file may be verified. If the file 'X' is not verified, the flow continues at block 720. Otherwise, the flow continues at block 718.

At block 718, a determination is made of whether the last file 'X' has been authenticated. In some embodiments, the authentication module 238 may make this determination. In particular, the authentication module 238 may determine if the operations at blocks 710-714 have been performed for all of the files 'X' on the secondary storage 208. If the last file 'X' on the secondary storage 208 has not been authenticated, the flow continues at block 710 (where another file 'X' is opened for authentication). Otherwise, the flow continues at the 'continue' block. The 'continue' block may represent the next operations to be executed to have the gaming machine operational, may represent that the gaming machine is now operational, etc. Accordingly, the flow diagram 700 is complete.

At block 720, the gaming machine is moved to an inoperative state. In some embodiments, the authentication module 238 may move the gaming machine to an inoperative state. In other words, the gaming machine is moved to an out-of-service state. Accordingly, the gaming machine cannot be played. In some embodiments, a gaming machine operator is required to move the gaming machine 110 back in service. For example, the gaming machine operator may be required to physically visit the gaming machine to ensure that there is no tampering, etc. The flow diagram 700 is complete.

In some embodiments, data may be first installed on the secondary storage prior to authentication. Installation of the data on the secondary storage is now described. In particular, FIG. 8 illustrates a flow diagram for installation of data in a secondary storage used for on-the-fly encryption of data stored therein, according to some embodiments of the invention. With reference to FIGS. 2 and 6, the operations of the flow diagram 800 illustrate the installation of the compressed files 601 on the nonvolatile memory 600 onto the secondary storage 208. While the flow diagram 800 describes the installation from the nonvolatile memory 600 that is within the gaming machine 110, embodiments are not so limited. For example, the installation may be from data received over the network from the master game server 102. The flow diagram 800 illustrates operations that may be executed by gaming machine 110. The flow diagram 800 will be described with reference to FIGS. 1-4 and 6. The flow diagram 800 commences at block 802.

At block 802, the nonvolatile memory is initialized. In some embodiments, the installation module 237 performs this initialization. This initialization may include verification that the nonvolatile memory 232 is accessible. The flow continues at block 804.

At block 804, a determination is made of whether the nonvolatile memory is verified. In some embodiments, the installation module 237 may perform the verification. This verification may include may include authentication of the contents of the nonvolatile memory 232 based on the digital signature 512 that is appended thereto (as shown in FIG. 5). If the nonvolatile memory 232 is not verified, the flow continues at block 824 (wherein the gaming machine is moved to an inoperative state, as described below). Otherwise, the flow continues at block 806.

At block 806, the secondary storage is mounted. In some embodiments, the installation module 237 may mount the secondary storage 208. The installation module 237 may mount the secondary storage 208 so that the secondary storage 208 is both readable and writable. The flow continues at block 808.

At block 808, the mount of the secondary storage is verified. In some embodiments, the installation module 237 may verify whether the secondary storage 208 was successfully mounted. If the mount operation was not verified, the flow continues at block 824. Otherwise, the flow continues at block 810.

At block 810, the secondary storage is formatted and partitioned. In some embodiments, the installation module 237 may format and partition the secondary storage 208. Examples of the partitions of the secondary storage 208 are illustrated in FIG. 4. The flow continues at block 812.

At block 812, the compressed files are verified. In some embodiments, the installation module 237 may verify the compressed files 601. In some embodiments, the compressed files 601 may include a digital signature appended thereto. Accordingly, the installation module 237 may verify the compressed files 601 based on the digital signature. Alternatively or in addition, the installation module 237 may verify that the compressed files are of a certain number, size, etc. The installation module 237 may also verify the dates of creation of the compressed files 601. If the compressed files are not verified, the flow continues at block 824. Otherwise, the flow continues at block 814.

At block 814, a determination is made of whether the on-the-fly encryption data is verified. In some embodiments, the installation module 237 may perform the verification. The installation module 237 may verify that a particular on-the-fly encryption file exists and that such file includes a correct number of encryption keys. For example, in some embodiments, an on-the-fly encryption file may include file encryption keys for the files stored on the secondary storage 208. In some embodiments, the on-the-fly encryption data 608 may include a digital signature appended thereto. Accordingly, the installation module 237 may verify the on-the-fly encryption data 608 based on the digital signature. While block 812 and block 814 described the verification of the compressed file and the on-the-fly encryption data as two separate operations, in some embodiments, the compressed file and the on-the-fly encryption data may be verified together based on the digital signature 612. In particular, the installation module 237 may generate a digital signature for the data stored in the nonvolatile memory 600 and compare the digital signature to the digital signature 612. If the on-the-fly encryption data is not verified, the flow continues at block 824. Otherwise, the flow continues at block 816.

At block 816, file 'X' is decompressed to the secondary storage. In some embodiments, the installation module 237 may decompress file 'X' of the compressed files 601 for installation into the secondary storage 208. The manifest data 610 (shown in FIG. 6) may include an identification of the file 'X'

An encryption key may be appended to file 'X'. Accordingly, the installation module 237 may encrypt and store file 'X' onto the secondary storage 208 using this encryption key. An identification of each file 'X' of the compressed files 601 may be stored in the on-the-fly encryption data 608 along with an associated encryption key. The installation module 237 may encrypt the file 'X' using its associated encryption key and store the encrypted file 'X' on the secondary storage 208. The flow continues at block 818.

At block 818, N % of the file 'X' is verified. In some embodiments, the installation module 237 may perform this verification. N may be 100 or some lesser value. For example, the installation module 237 may verify 5%, 10%, 25%, 75%, 90%, 100%, etc. of file 'X'. This may be a configurable value. In some embodiments the N may be different for each file 'X' in the secondary storage 208. For example, for large files, a smaller percentage may be verified. The installation module 237 may verify based on a digital signature of the file 'X'. Accordingly, the installation module 237 may compute a digital signature of N % of the file 'X'. The installation module 237 may verify the file 'X' based on a comparison this computed digital signature to the stored digital signature. If the two digital signatures are equal, the file 'X' may be considered verified. If the file 'X' is not verified, the flow continues at block 824. Otherwise, the flow continues at block 820.

At block 820, a determination is made of whether the last file 'X' has been authenticated. In some embodiments, the installation module 237 may make this determination. If the last file 'X' of the compressed files 601 has not been authenticated, the flow continues at block 816 (where another file 'X' is decompressed). Otherwise, the flow continues at the 'continue' block. The 'continue' block may represent the next operations to be executed to have the gaming machine operational, may represent that the gaming machine is now operational, etc. Accordingly, the flow diagram 800 is complete.

At block 824, the gaming machine is moved to an inoperative state. In some embodiments, the installation module 237 may move the gaming machine to an inoperative state. In other words, the gaming machine is moved to an out-of-service state. Accordingly, the gaming machine cannot be played. In some embodiments, a gaming machine operator is required to move the gaming machine 110 back in service. For example, the gaming machine operator may be required to physically visit the gaming machine to ensure that there is no tampering, etc. The flow diagram 800 is complete.

Subsequent to the possibly installation and authentication of the data on the secondary storage of the gaming machine 110, the gaming machine 110 may become operational. As described above, in some embodiments, the data stored in the secondary storage of the gaming machine 110 may be encrypted. The operations of accessing such data (including reading and writing) from the secondary storage are now described. In particular, FIG. 9 illustrates a flow diagram for on-the-fly encryption of data stored in a secondary storage in a gaming machine, according to some embodiments of the invention. FIG. 9 illustrates operations that may be executed by gaming machine 110. The flow diagram 900 is described with reference to FIGS. 1-6. With reference to FIG. 2, the flow diagram 900 may be initiated based on a request to access data from the secondary storage 208. The access may include reading or writing data thereto. For example, the reading may relate to access video data for display on the gaming machine 110. The flow diagram 900 commences at block 902.

At block 902, a determination is made of whether the secondary storage is accessible. In some embodiments, the authentication module 238 may make the determination of whether the secondary storage 208 is accessible. For example, the authentication module 238 may perform a test read and/or test write to the secondary storage 208. If the secondary storage is not accessible, the flow continues at block 912 (wherein the gaming machine is moved to an inoperative state, as described below). Otherwise, the flow continues at block 904.

At block 904, partition 'M' is opened. In some embodiments, the on-the-fly encryption module 240 may open partition 'M'. As described above, the secondary storage 208 may be separated into one or more partitions for storage of data. Therefore, the on-the-fly encryption module 240 may determine which partition 'M' that the data is stored. For example, with reference to FIG. 4, if a sound is needed for a gaming application, the on-the-fly encryption module 240 may open partition 2. In some embodiments, the secondary storage 208 (which may be a container file) is first opened. In particular, the on-the-fly encryption module 240 may open the container file to access the partitions therein. The on-the-fly encryption module 240 may open this single file using encryption key in the ROM 234 to allow access to partition 'M' on the secondary storage 208. The flow continues at block 906.

At block 906, a determination is made of whether partition 'M' is verified. In some embodiments, the on-the-fly encryption module 240 may make this determination. The on-the-fly encryption module 240 may verify based on whether the partition 'M' is accessible from the secondary storage 208. In particular, the on-the-fly encryption module 240 may determine whether a read or write operation may be performed in the partition 'M'. If the partition 'M' is not verified, the flow continues at block 912. Otherwise, the flow continues at block 908.

At block 908, a file 'Z' is opened. In some embodiments, the on-the-fly encryption module 240 may open the file 'Z'. This may be for a request to read from or write to the file 'Z'. As part of the opening of the file 'Z', the on-the-fly encryption module 240 may decrypt the file using the associated encryption key that is stored in the on-the-fly encryption data 508/608. The flow continues at block 910.

At block 910, a determination is made of whether file 'Z' is verified. In some embodiments, the on-the-fly encryption module 240 may make this determination. The verification may include whether the file may be located on the secondary storage 208. Moreover, as described above, the manifest data 510/610 may store a size of each file stored on the secondary storage 208. Accordingly, the on-the-fly encryption module 240 may verify that the size of the file 'Z' on the secondary storage 208 is the same as the size stored that the manifest data 510/610. If the file 'Z' is not verified, the flow continues at block 912. Otherwise, the flow continues at the 'continue' block. The 'continue' block may represent the next operations to be executed after opening the file 'Z'. Such operations may include a write or read operation by an application executing on the processors 202. Accordingly, the flow diagram 900 is complete.

At block 912, the gaming machine is moved to an inoperative state. In some embodiments, the on-the-fly encryption module 240 may move the gaming machine to an inoperative state. Accordingly, the gaming machine cannot be played. In some embodiments, a gaming machine operator is required to move the gaming machine 110 back in service. For example, the gaming machine operator may be required to physically visit the gaming machine to ensure that there is no tampering, etc. The flow diagram 900 is complete.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A computer-implemented method of accelerated initialization of a computerized wagering game machine configured to conduct a wagering game, the game machine including one or more processors, nonvolatile memory storage, and one or more memory storage devices storing a plurality of gaming components, the method comprising:
   authenticating, via at least one of the one or more processors, initialization data received into the nonvolatile memory storage;
   in response to successfully authenticating the initialization data and wherein each of the plurality of gaming components is associated with a distinct designated authentication percentage, authenticating, via at least one of the one or more processors, the distinct, designated authentication percentage of each gaming component of the plurality of gaming components, wherein at least one of the designated authentication percentages is less than 100 percent; and
   in response to successfully authenticating the designated authentication percentage of each gaming component of the plurality of gaming components and prior to authenticating any remaining percentage of each gaming component of the plurality of gaming components, making the wagering game machine operable to conduct the wagering game.

2. The computer-implemented method of claim 1, further comprising, in response to an unsuccessful authentication of the designated authentication percentage of one or more gaming components of the plurality of gaming components, making the wagering game machine inoperable to conduct the wagering game.

3. The computer-implemented method of claim 1, further comprising, after making the wagering game operable, authenticating a remaining percentage of each gaming component of the plurality of gaming components while conducting the wagering game on the wagering game machine.

4. The computer-implemented method of claim 1, wherein the designated authentication percentages of at least two gaming components of the plurality of gaming components are different from each other.

5. The computer-implemented method of claim 1, wherein the designated authentication percentage of each gaming component of the plurality of gaming components depends on the corresponding gaming component.

6. The computer-implemented method of claim 1, wherein the designated authentication percentages of all of the gaming components of the plurality of gaming components are less than 100 percent.

7. The computer-implemented method of claim 1, further comprising, after making the wagering game machine operable, authenticating any remaining unauthenticated gaming components stored on the wagering game machine while conducting the wagering game on the wagering game machine.

8. The computer-implemented method of claim 1, wherein the plurality of gaming components includes at least one of instructions for conducting the wagering game and license-enforcement data related to one or more gaming components.

9. A computerized wagering game machine configured to conduct a wagering game, the wagering game machine comprising:
   nonvolatile memory storage;
   one or more processors; and
   one or more memory storage devices storing a plurality of gaming components, each of the plurality of gaming components being associated with a distinct, designated authentication percentage, wherein at least one of the designated authentication percentages is less than 100 percent;
   wherein at least one of the one or more processors executes instructions that cause the wagering game machine to:
      authenticate initialization data received into the nonvolatile memory storage;
      in response to successfully authenticating the initialization data, authenticate the designated authentication percentage of each of the gaming components of the plurality of gaming components; and
      in response to successfully authenticating the designated authentication percentage of each of the gaming components of the plurality of gaming components and prior to authenticating any remaining percentage of each of the gaming components of the plurality of gaming components, become operable to conduct the wagering game.

10. The wagering game machine of claim 9, wherein the designated authentication percentage of at least one gaming component of the plurality of gaming components is configurable by an operator or wagering game establishment prior to initialization of the wagering game machine.

11. The wagering game machine of claim 9, wherein the initialization data is delivered to the nonvolatile memory storage from an external memory storage device.

12. The wagering game machine of claim 9, wherein the initialization data is delivered to the nonvolatile memory storage from a server via a communications network.

13. The wagering game machine of claim 9, wherein the plurality of gaming components includes at least one of instructions for conducting the wagering game and license-enforcement data related to one or more gaming components.

14. The wagering game machine of claim 9, wherein, after making the wagering game operable, the instructions further cause the game machine to authenticate any remaining percentage of each gaming component of the plurality of gaming components while the game machine conducts the wagering game.

15. The wagering game machine of claim 14, wherein, in response to an attempt use a gaming component prior to 100 percent authentication of the respective gaming component, the instructions further cause the game machine to become inoperable.

16. A machine-readable, non-transitory medium storing instructions that, when executed by one or more processors, cause a wagering game machine including nonvolatile memory storage and one or more memory storage devices to perform a method comprising:

authenticating initialization data received into the nonvolatile memory storage;

authenticating on-the-fly encryption data stored on at least one of the one or more memory storage devices;

in response to successfully authenticating the initialization data and the on-the-fly encryption data, decrypting one or more of a plurality of game components stored on at least one of the one or more memory devices, wherein the one or more game components are decrypted via the on-the-fly encryption data using separate encryption key and wherein each of the one or more decrypted game components is associated with a distinct, designated authentication percentage;

authenticating the distinct, designated authentication percentage of each decrypted gaming component of the plurality of gaming components, wherein at least one of the designated authentication percentages is less than 100 percent; and in response to successfully authenticating the designated authentication percentage of each decrypted gaming component and prior to authenticating any remaining percentage of each decrypted gaming component, making the wagering game machine operable to conduct the wagering game.

17. The machine-readable medium of claim 16, further comprising, in response to an unsuccessful authentication of the designated authentication percentage of one or more of the decrypted gaming components of the plurality of gaming components, making the wagering game machine inoperable to conduct the wagering game.

18. The machine-readable medium of claim 16, wherein the initialization data is delivered to the nonvolatile memory storage from an external memory storage device.

19. The machine-readable medium of claim 16, wherein authenticating includes one or more of comparing a stored digital signature to a computed digital signature, comparing a stored hash value with a computed hash value, and encrypting/decrypting using an encryption key.

20. The machine-readable medium of claim 16, wherein the plurality of gaming components includes at least one of instructions for conducting the wagering game and license-enforcement data related to one or more gaming components of the plurality of gaming components.

* * * * *

UNITED STATES PATENT AND TRADEMARK OFFICE
CERTIFICATE OF CORRECTION

PATENT NO. : 8,705,739 B2  
APPLICATION NO. : 12/065297  
DATED : April 22, 2014  
INVENTOR(S) : Steven M. Campbell Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Twenty-ninth Day of September, 2015

Michelle K. Lee
*Director of the United States Patent and Trademark Office*